United States Patent [19]

Collura

[11] Patent Number: 5,503,464
[45] Date of Patent: Apr. 2, 1996

[54] SELF-BALANCING WHEEL FOR MOTORIZED VEHICLES

[76] Inventor: John A. Collura, P.O. Box 766, South Fallsburg, N.Y. 12779

[21] Appl. No.: 322,120

[22] Filed: Oct. 12, 1994

[51] Int. Cl.⁶ ................................................. B60B 19/06
[52] U.S. Cl. ................................... 301/5.22; 74/573 F
[58] Field of Search ............................. 301/5.21, 5.22; 295/6; 74/573 R, 573 F, 574; 188/378; 152/154.1; 464/180

[56] References Cited

U.S. PATENT DOCUMENTS

| | | | |
|---|---|---|---|
| 2,687,918 | 8/1954 | Bell et al. | 301/5 |
| 2,734,420 | 3/1956 | Wilborn | 301/5 |
| 2,909,389 | 10/1959 | Wilborn | 301/5 |
| 3,077,914 | 2/1963 | Fritts | 152/330 |
| 3,164,413 | 1/1965 | Salathiel | 301/5 |
| 3,316,021 | 4/1967 | Salathiel | 301/5 |
| 3,346,303 | 10/1967 | Wesley | 301/5 |
| 3,376,075 | 4/1968 | Mitchell | 301/5 |
| 3,462,198 | 8/1969 | Onufer | 301/5.22 |
| 3,733,923 | 5/1973 | Goodrich et al. | 74/573 |
| 3,786,850 | 1/1974 | Turoczi, Jr. | 152/330 |
| 3,913,980 | 10/1975 | Cobb, Jr. | 301/5 |
| 4,200,003 | 4/1980 | Miller | 74/573 F X |
| 4,253,514 | 3/1981 | Imamura | 152/405 |
| 4,269,451 | 5/1981 | Narang | 301/5 |
| 4,314,964 | 2/1982 | Ferrary | 264/501 |
| 4,339,963 | 7/1982 | Bremer, Jr. | 74/573 F X |
| 4,388,841 | 6/1983 | Gamble | 74/573 |
| 4,432,253 | 2/1984 | Kerlin | 74/573 |
| 4,518,204 | 5/1985 | Takada | 301/63 |
| 4,755,006 | 7/1988 | Clay et al. | 301/5 |
| 4,871,152 | 10/1989 | Funahashi | 74/573 F X |
| 4,892,174 | 1/1990 | Takekado | 188/378 |
| 5,048,367 | 9/1991 | Knowles | 74/573 |
| 5,142,936 | 9/1992 | McGale | 74/573 |
| 5,197,352 | 3/1993 | Haikawa | 74/573 F X |
| 5,253,928 | 10/1993 | Patti | 301/5.22 |

FOREIGN PATENT DOCUMENTS

| | | | |
|---|---|---|---|
| 1296215 | 5/1962 | France | 301/5.22 |
| 0630537 | 9/1978 | U.S.S.R. | 74/573 F |

*Primary Examiner*—Russell D. Stormer
*Attorney, Agent, or Firm*—Pennie & Edmonds

[57] ABSTRACT

The invention relates to a motor vehicle wheel capable of improved dynamic self-balancing against imbalancing forces in the X, Y and Z planes. The wheel comprises a hub portion and an annular rim portion integral with the hub and extending circumferentially around the hub portion. The rim has inner and outer flanges adapted for securing a tire to the wheel. The rim portion is provided with a circumferential integral annular channel containing a quantity of balancing fluid having a relatively high boiling point and a relative low freezing point and whose remaining physical properties are not negatively affected by adverse environmental conditions. As the wheel rotates, the fluid spinning within the channel will substantially instantaneously counteract imbalances within the wheel and tire combination caused by irregularities due to, e.g., valve stems, dents and attached road debris by migrating to a location within the channel directly opposite the imbalancing force.

8 Claims, 2 Drawing Sheets

SELF-BALANCING WHEEL FOR MOTORIZED VEHICLES

TECHNICAL FIELD

The invention is directed to means for dynamically balancing a rotatable object while in motion and, more particularly, to a self-balancing wheel for use on motorized vehicles.

BACKGROUND OF THE INVENTION

When the wheel of a motorized vehicle, such as an automobile, rotates at high speed, it is important that the wheel be properly balanced. At low speeds imbalance causes only minor difficulties, but with modern high speed vehicles and roads an unbalanced wheel presents major problems. In an unbalanced condition the wheel's center of mass does not coincide with its center of rotation, causing the wheel to vibrate and/or bounce on the pavement and leading to a number of undesirable effects. These effects include a shimmy in the steering mechanism of the vehicle, uneven wear on the tires and increased wear on breaking systems, front-end suspension systems and the like.

The common remedy in the case of passenger cars and other motorized vehicles for the conditions described above is to have the vehicle's wheels balanced. Various means have been utilized in the prior art for this purpose. One common wheel balancing technique is static balancing by the use of lead weights. In common practice such weights are typically clamped to the rim portion of the wheel. In an alternate arrangement, however, as described in U.S. Pat. No. 3,786,850 to Turocci, Jr., the weights may instead be attached to the outer surface of the tire.

While such weights may generally improve the wheel balance, they are incapable of producing optimal results since their position on the wheel is fixed and they thus tend to compensate for only a single imbalancing condition. Therefore, in the event that the condition changes due to tire wear or some other cause, the balancing effect provided by the weights is no longer effective. Further, installation of such weights typically requires the service of experienced mechanics and specialized equipment. Moreover, each time a new or repaired tire is installed on a wheel, the balancing operation must be repeated. Weights are frequently lost or misplaced when repairing or changing tires. Therefore, a large percentage of vehicles presently on the road are typically operated with unbalanced wheels, and are therefore prone to many of the problems described above.

There has thus been a continuing interest, among those working this field, in the development of balancing means adapted to be permanently mounted upon a vehicle wheel. It has been further deemed desirable that such means be capable of continuous operation as the wheel rotates to provide a dynamic counterbalancing effect to offset any static imbalance existing or created in the Wheel and/or tire assembly. In this regard, various dynamic balancing mechanisms or devices have been developed in the prior art which are adapted for installation upon the wheel of a motor vehicle. Most such devices, as described below, incorporate in some manner a quantity of weighted elements and/or a damping fluid which is distributed about the rotational axis of the wheel, as the wheel rotates, to a position diametrically opposite to the mass tending to cause imbalance to the wheel and/or the tire to provide a partial counterbalancing effect.

As described, e.g., in U.S. Pat. Nos. 3,164,413 and 3,316,021 to Salathiel; 3,346,303 to Wesley; 3,376,075 to Mitchell and 5,253,928 to Patti, in one version of such prior art dynamic balancing devices, the weights and/or fluid are contained within a hollow annular hoop member which is secured in some manner, e.g., with the use of fasteners, to the outer surface of the hub portion of the wheel.

U.S. Pat. Nos. 3,164,413 and 3,316,021 to Salathiel describe a hollow annular hoop containing a plurality of spherical weights and a damping fluid. The annular hoop is made of a plastic material. In use, the hoop is attached to a rotating wheel and the weights are free to move within the hoop. The damping fluid reduces noise as well as restricts the free movement of the weights. The weights are urged toward the point in the hoop which offsets the imbalance of the wheel.

The apparatus described in the Salathiel patents, however, has the disadvantage of using a deformable material, i.e., a plastic, for the annular hoop. Under conditions of rotation at high speed the hoop can bulge where it is free to move and this loss of concentricity causes an imbalance to the device. Loss of concentricity of the hoop can also prevent free movement of the weights.

U.S. Pat. No. 3,346,303 to Wesley describes a hollow annular hoop containing a plurality of spherical weights and a measured amount of damping fluid. The hoop has an apex at its outer perimeter and is adapted with the outer apex to provide reduced areas of contact between the spherical weights and the hoop when the hoop is rotated. The hoop is constructed of a metal formed or welded into the proper shape or configuration and is attached to the wheel of the vehicle by use of a mounting fixture which has several precut lug nut holes adapted to fit the wheel.

U.S. Pat. No. 3,376,075 to Mitchell describes a dynamic wheel balancing device which includes a hollow annular hoop with a plurality of spherical weights and a damping fluid. The hoop is attached to a mounting fixture which is adapted to fit a variety of wheel and lug nut configurations. The annular hoop is constructed by attaching a U-shaped channel onto a plate in a fluid tight manner.

U.S. Pat. No. 5,253,928 to Patti describes a method for attaching a dynamic wheel balancer to a vehicle wheel. The balancer is a hollow annular tube containing metal balls and a damping fluid, e.g., an oil. The wheel balancer is concentrically mounted against the wheel, preferably against the outside of the tire rim. The balancer may be installed by either placing it within a recess formed in a wheel cover and attaching the wheel cover to the wheel, or alternately, by placing the balancer against the wheel and holding it in place with, e.g., adhesive tape while the wheel cover is attached.

One drawback to the use of balancing means including spherical weights as described above for the dynamic stabilization of a tire and/or wheel assembly is that the surfaces of the balancing spheres tend to suffer from some limited degree of corrosion over time. The resultant corroded surfaces tend to become wetted and sticky by exposure to the damping fluid which is employed. The balancing spheres thus tend to bunch up and stick together. They stick together with increasing frequency and tenacity as the balancing weights are reduced in size, thus exposing a larger wetted surface to the other balancing weights. Under such conditions, therefore, groups of such weights tend to become wedged when attempting to pass one another or in passing a weight stuck to the inner surface of the annular tube or hoop.

Another significant disadvantage to the use of the dynamic balancing means described above is that such means require the vehicle owner to "add on" a heavy awkward ring structure to the vehicle wheel. The use of such a device not only requires significant time and effort for its installation, but also adds appreciably to the weight of a vehicle wheel so equipped.

Thus, in a further effort to at least partly overcome the disadvantages discussed above, there has been developed dynamic stabilizing means installed upon an inner surface of a motor vehicle wheel between the flanges comprising the wheel rim. One major drawback of such means, however, is that they typically protrude upwardly into the air cavity of the tire, thus filling in the drop center of the rim, thereby interfering with the ability to mount and dismount the tire from or onto the rim. In an effort to overcome this problem, internal dynamic balancing devices have been developed which are adapted to be recessed below the drop center of the wheel. An example of such an arrangement is illustrated in U.S. Pat. No. 2,737,420 to Wilborn.

The Wilborn patent describes a means for dynamic balancing of motor vehicle wheels embodying a wheel comprising a rim portion having an annular recess and a band positioned upon the rim providing a closure for the recess so as to form an enclosed channel running around a central portion of the wheel. This channel may be provided with a plurality of globular balancing elements and a quantity of damping fluid which circulates around the circumference of the wheel during rotation to produce a dynamic balancing effect while the wheel is in motion.

The arrangement described in Wilborn, however, suffers from a significant drawback in that the dynamic balancing forces thus provided are brought to bear only within an inner central annular portion of the wheel mass. Thus there is only limited balancing of vector forces along the X (side to side) and Y (up and down) planes and no balancing at all of the vector forces along the Z (yaw-type movement) plane. Moreover, in addition no balancing effect is obtained with the use of means such as those described in Wilborn at the outer fringes of the wheel where it is needed most, i.e., at the flange portions of the wheel rim, which are the most likely areas to require balancing due to the unbalancing effects of tire irregularities, the presence of valve stems, dents due to impact with curbs, potholes, etc. and the attachment of road debris.

SUMMARY OF THE INVENTION

It is therefore a principal object of the present invention to provide a wheel for use on motorized vehicles which is capable of an improved degree of dynamic self-balancing wherein the balancing effect is capable of correcting imbalancing vector forces in three dimensions, i.e., along the X, Y and Z planes.

A further object of the invention is to provide a wheel for use on motorized vehicles comprising balancing means formed integrally therewith wherein the balance of the wheel is continually adjusted as the wheel is in motion and wherein the balancing means remains in operation continuously throughout the life of the wheel without the need for any maintenance.

Another object of the invention is to provide a continuously balanced wheel for motorized vehicles which is of a simple and economic construction.

A still further object of the present invention is to provide a self-balancing wheel for motorized vehicles wherein dynamic balancing means formed integrally thereupon does not protrude into the drop center of the wheel and thus does not interfere with the mounting or dismounting of tires onto or off of the wheel.

The present invention is therefore directed to a continuously dynamically self-balancing motor vehicle wheel which is adapted to provide balancing forces to instantly and continuously counterbalance imbalancing vector forces in three dimensions, i.e., along the X, Y and Z planes, thus substantially preventing undesirable up and down (i.e., Y plane), side to side (X plane) and yaw-type movement (i.e., in the Z plane) of the tire and wheel assembly which may otherwise occur due to the presence of such imbalancing forces.

In a first embodiment of the invention, the wheel comprises a centrally located hub portion and an annular outer rim portion integral with the hub portion and extending circumferentially around the hub portion. The rim portion comprises a pair of flanges, i.e., an inner and outer flange, separated by an annular trough. The hub portion defines a centrally located aperture configured and adapted to allow passage of the axle hub to permit rotation of the vehicle wheel. The hub portion is additionally provided with a plurality of lug bolt holes adapted to permit passage of lug bolts attached to the vehicle brake drum which are adapted for securing the wheel to the vehicle.

A hollow annular chamber is formed integrally within the rim portion of the wheel, extending without interruption around the entire circumference of the wheel. The channel traverses substantially the entire width of the wheel, extending into both the inner and outer flanges of the wheel rim. The member forming the upper surface of the chamber forms the annular trough which, as discussed above, separates the inner and outer rim flanges.

A quantity of a balancing fluid is deposited within the chamber through a drain plug in the wheel rim. The chamber is not entirely filled with the fluid, but rather a sufficient amount is added to fill the chamber approximately one-quarter to one-half full when the wheel is at rest. This ensures that there will be a sufficient amount of the fluid to counteract any imbalancing forces to which the wheel and tire assembly may be subjected. The preferred balancing fluid for use with the invention is a liquid with a relatively high boiling point and low freezing point, whose viscosity is not appreciably affected by changes in temperature or other environmental conditions.

As the wheel rotates, it becomes subject to imbalancing forces caused by, for example, tire irregularities, dents and attached road debris. The balancing fluid circulating throughout the chamber portion of the rotating wheel therefore instantly migrates to those areas of the chamber opposite the imbalancing force to provide a continuous counterbalancing force in opposition thereto, thus substantially preventing undesirable up and down, side to side and yaw-type movement of the wheel in the X, Y and Z planes when the vehicle is in motion.

In a further embodiment of the invention, the chamber may be extended from the wheel rim into the hub portion of the wheel. This arrangement enhances the instant, continuous balancing effect described above since allowing the balancing fluid to circulate within at least a portion of the wheel hub, as well as through the wheel rim, permits it to counterbalance an even further increased (i.e., in contrast to the prior art) number and degree of imbalancing forces.

In the preferred embodiment, it is desirable to extend the chamber only upon the outer side of the wheel. This is because, as one skilled in the art would recognize, although it would also be beneficial in theory to extend the chamber along the inner face of the wheel hub to permit the balancing fluid to circulate therein as well, practically speaking the feasibility of such an arrangement must take into account the additional clearance space required on the inner surface of the wheel for braking and stabilizing mechanisms associated with the motor vehicle. Thus a significant modification of the wheel construction would be required in order to construct a wheel having such a configuration.

DETAILED DESCRIPTION OF THE PREFERRED EMBODIMENTS

Figure 1:
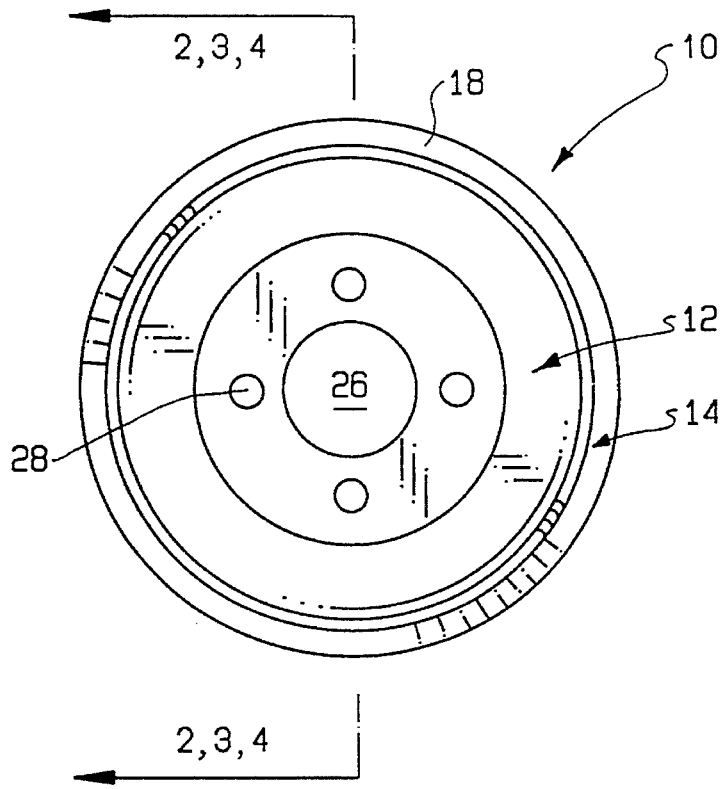
FIG. 1 is a side view of a representational embodiment of the self balancing motor vehicle wheel of the invention.

In the accompanying drawings and the following specification, the same reference characters are used to designate the same parts and elements throughout.

Turning initially to FIG. 1 there is illustrated the general outward appearance of motor vehicle wheel 10 of the invention. Wheel 10 comprises a central hub portion 12 and an annular rim portion 14 integral with the hub portion and extending circumferentially about the hub portion 12. Hub portion 12 defines a central opening 26 configured and adapted for passage of the hub of an axle (not shown) to permit rotation of wheel 10. In addition, hub portion 12 further defines a plurality (i.e., usually four or five) of lug bolt holes 28 for use in mounting wheel 10 to the axle and brake drum assembly (not shown) of a motor vehicle.

Figure 2:
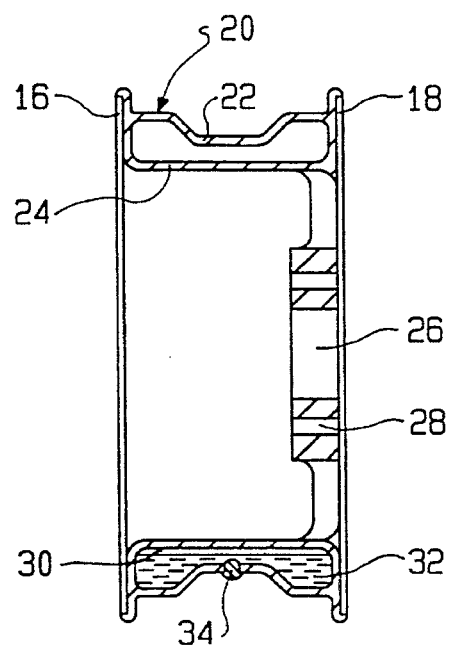
FIG. 2 is a sectional view through the wheel of FIG. 1 illustrating a first embodiment of the present invention.
Figure 3:
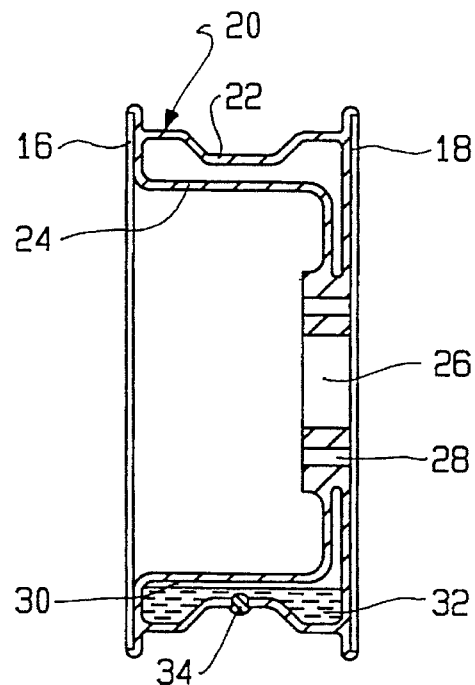
FIG. 3 is a sectional view through the wheel of FIG. 1 illustrating another embodiment of the invention.
Figure 4:
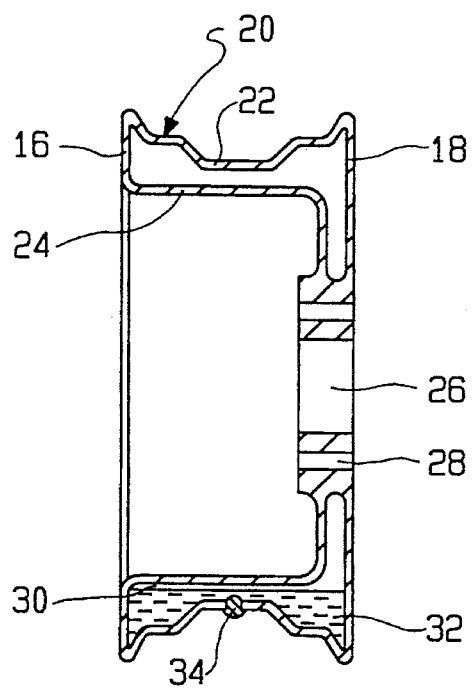
FIG. 4 is a sectional view through the wheel of FIG. 1 illustrating a still further embodiment of the present invention.

As shown more clearly in FIGS. 2–4, rim portion 14 of wheel 10 comprises inner flange 16 and outer flange 18 separated by a trough-shaped member 20 having a flat-bottomed annular depression 22. Member 20 also forms the upper surface of the annular balancing means of the invention as described below. As used herein, the term "inner" and/or "inwardly" is used to designate that portion of wheel 10 which faces toward the motor vehicle, i.e., most nearly adjacent the brake drum. The terms "outer" and/or "outwardly" on the other hand, are used to refer to that surface of wheel 10 which faces away from the vehicle.

FIG. 2 is a cross-sectional view through wheel 10 illustrating a first embodiment of the invention. As can be seen from the figure, wheel 10 includes an integrally formed hollow annular chamber 30 extending uninterruptedly around the entire inner circumference of the wheel rim, from and including the inner flange 16 to the outer flange 18 of rim portion 14, bordered upon its upper surface by member 20 and upon its lower surface by member 24 formed integral with hub portion 12. Chamber 30 comprises first and second compartments extending, respectively, into inner 16 and outer 18 flanges, having, in the preferred embodiment, substantially equal volumes. Chamber 30 further comprises a third compartment between the first and second compartments and formed integral therewith for connecting the first and second compartments to each other. The third compartment has a relatively smaller volume than the first and second compartments in that member 20 which defines the upper surface of a chamber 30 has a depression 22 along its central portion for the purpose of providing a drop center within the rim 14 to facilitate mounting and demounting of tires from the wheel.

The configuration of chamber 30 is novel in that, as shown in FIG. 2, it extends across substantially the entire width of wheel 10 into the inner and outer flanges 16, 18 of rim portion 14. This permits, as explained below, a more complete and truer balance of wheel 10 than has previously been achieved with prior art balancing devices.

Within chamber 30 is hermetically sealed a quantity of a balancing fluid 32 which is added to the chamber through drain plug 34. Chamber 30 is not entirely filled with fluid 32, since to do so would slow down passage of the fluid through the chamber and thus significantly reduce the balancing capabilities of the fluid. In practice, it is preferred to add a sufficient amount of balancing fluid to fill chamber 30 approximately one-quarter to one-half full, e.g., from about 8 to about 32 fluid ounces, depending upon the relative size of the wheel. This ensures that there is enough fluid to obtain the desired balancing effect. The actual number of fluid ounces of liquid used would, of course, depend upon the size of the wheel. Thus it would be a relatively simple matter for one skilled in the art to determine the amount of liquid to be added to each sized wheel which is available. Fluid 32 runs down to the lower portion of wheel 10 when the vehicle is stationary.

In operation, however, the dynamic balancing action is produced when the fluid 32 moves as the wheel rotates, under the action of imbalancing vector forces in the X, Y and/or Z planes, toward the portion of the wheel opposite the force which is causing the imbalance. This action produces a substantially instant and continuous correction for such imbalancing forces by obeying Newton's law of motion, i.e., for every action there is an equal and opposite reaction. The shape of chamber 30 as configured in the present invention permits balancing fluid 32 to reach the extreme inner and outer edges, respectively, of wheel 10, i.e., by extending into flanges 16 and 18, thus providing three-dimensional counterbalancing forces against the X, Y and/or Z plane vector forces to prevent undesirable side to side, up and down and yaw-type movement of the wheel.

The fluid 32 located within chamber 30 is preferably a liquid having a relatively high boiling point, a relatively low freezing point and whose viscosity is not appreciably changed due to changes in temperature or to other environmental conditions. The liquid may be aqueous or non-aqueous. The liquid should additionally be non-flammable to avoid any hazard due to leakage in case of, e.g., an accident involving the motor vehicle where the liquid may escape from the wheel. Additionally, it should be noted that the balancing action of the present invention occurs solely due to the action of the balancing fluid. That is, wheel 10 of the invention requires no weighted elements in contrast to many prior art balancing means. Thus wheel 10 is significantly quieter than prior art motor vehicle wheels when in motion.

Fluid 32 may be aqueous or non-aqueous. Some non-limiting examples of preferred fluids 32 for use with the invention are glycerin, ethylene glycol and hydraulic fluids such as those which are used in the transmission or brake system of an automobile. In addition to the materials noted above, silicon-based fluids, such as the material manufactured by the General Electric Company under the trade name SF 96 and sold for use as a lubricant and oil defoamer, are also useful with the invention. The subject silicon-based materials have the following physical characteristics:

| | |
|---|---|
| Pour Point | −120° F. |
| Thermal Expansion (cc/cc/c) (32°–302° F.) | .00105 |
| Viscosity (77° F.) | 5 centistokes |

As would be readily understandable to one of ordinary skill in the art, however, a variety of balancing liquids are capable of meeting the requirements of the present invention and thus the materials listed above are provided only as examples of useful fluids, i.e., they should not be construed as limiting the invention. In general, fluids 32 for use in the present invention should have the following physical characteristics which are readily determinable by one of ordinary skill in the art without any undue experimentation:

| | |
|---|---|
| Minimum Freezing Point | −120° F. |
| Minimum Boiling Point | 330° F. |
| Maximum Thermal Expansion (aqueous fluids) | 5.7% (32° F.–180° F.) |
| Maximum Thermal Expansion (non-aqueous fluids) | 0.00105 (32°–302° F.) |

Further to the above, as can be seen, e.g., in FIGS. 2–4, chamber 30 is recessed below the level of inner and outer rim flanges 16, 18 respectively. In particular, the depression 22 in member 22 maintains intact the drop center of wheel 10. Therefore, the balancing means of the invention neither inhibits nor interferes with the removal or mounting of the tire upon wheel 10 at rim portion 14 in the normal fashion.

Turning now to FIG. 3 there is shown an alternate embodiment of the dynamically self-balancing wheel 10 of the invention. In the subject embodiment chamber 30 is extended into hub portion 12 along the side thereof adjacent the outer face of the wheel. Thus the instant, continuous balancing effect obtained with the invention is further improved since fluid 32 is therefore able to exert its counterbalancing forces beyond the annular surface of the wheel circumference and into the lateral surface of the wheel hub. This arrangement therefor provides an enhanced degree of three-dimensional counterbalancing along the X, Y and Z planes.

FIG. 4 illustrates a still further embodiment of the invention which is substantially similar to that shown in FIG. 3, except that in the embodiment depicted in FIG. 4, chamber 26 extends all the way out to the very outer peripheral edges of flanges 16 and 18. This further enhances the instant, continuous dynamic balancing effect obtained by permitting the balancing fluid 28 to migrate to the extreme outer fringe of the tire bead area.

As described above, therefore, the dynamically self-balancing motor vehicle wheel of the present invention offers several significant benefits over prior art balancing means. These benefits include:

the balancing means of the present invention is formed integrally as part of the wheel, thus eliminating the need to "add on" a cumbersome, weighty balancing ring as used in some prior art balancing devices. It also eliminates the possibility of mechanical failure or damage to the balancing mechanism due to impact when the vehicle wheel is in motion;

the balancing means of the present invention is recessed below the level of the rim flanges and thus the drop center of the wheel is maintained to facilitate the mounting and demounting of tires upon the wheel;

the wheel of the invention operates more quietly than wheels equipped with many prior art balancing devices since there is no mechanical device or added metallic balancing spheres which, upon rotation, may create noise within the wheel;

under normal operating conditions, the balancing means of the invention will never require servicing during the life of the wheel since the fluid is hermetically sealed within the chamber; and the shape of the annular chamber allows the balancing fluid to reach the outer portions of the tire bead area, thus promoting a condition of truer balance in the wheel and tire combination since it is able to substantially instantaneously counterbalance forces in each and/or any of the X, Y and Z planes. The fluid balancing medium is also more evenly distributed inside the wheel, both at rest and in motion, than in prior art motor vehicle wheels.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

I claim:

1. A self-balancing wheel for motorized vehicles comprising:

a hub portion located substantially centrally upon said wheel;

a rim portion located circumferentially about said hub portion and integral therewith, said rim portion comprising inner and outer flange members adapted for securing a tire to said wheel;

an open annular chamber defined integrally within said rim portion of said wheel, extending uninterruptedly across substantially the entire width of said rim portion into said inner and outer flange members and around said rim portion; and a sufficient quantity of a balancing fluid to counterbalance any of a plurality of imbalancing forces applied to said wheel during rotation thereof in an x, y or z plane, wherein said balancing fluid is sealed within said annular chamber and migrates, upon the application of imbalancing forces to the wheel during rotation thereof, to a position within the chamber opposite each said force, to continuously counterbalance the effect thereof, said balancing fluid remaining in a substantially liquid state while exerting said counterbalancing effect.

2. The self-balancing wheel of claim 1 wherein said annular chamber is comprised of:

first and second compartments extending, respectively, into said inner and said outer flange members, said first and said second compartments having substantially equal volumes; and a third compartment located between said first and said second compartments and formed integral therewith for connecting said first compartment to said second compartment, said third compartment having a relatively smaller volume than said first and said second compartments.

3. The self-balancing wheel of claim 2 wherein said third compartment has a reduced height relative to that of said first and said second compartments to produce a drop center within said rim portion for facilitating mounting and demounting a tire from said rim.

4. The self-balancing wheel of claim 1 wherein at least one of said first and said second compartments extends from said rim portion into the hub portion of said wheel.

5. The self-balancing wheel of claim 1 wherein said balancing fluid is an aqueous or a non-aqueous liquid whose viscosity is not appreciably changed when subjected to environmental conditions encountered within said wheel.

6. The self-balancing wheel of claim 5 wherein said balancing fluid is selected from the group consisting of a hydraulic fluid, a silicon based fluid, glycerin and ethylene glycol.

7. A self-balancing wheel for motorized vehicles comprising:

a hub portion located substantially centrally upon said wheel;

a rim portion extending circumferentially about said hub portion and integral therewith, said rim portion comprising inner and outer flange members adapted for securing a tire to said wheel;

an open annular chamber defined integrally within said rim portion of said wheel and extending uninterruptedly to said inner and outer flange members and around said rim portion, said annular chamber comprising first and second compartments extending, respectively into said inner and said outer flange members, said first and second compartments having substantially equal volumes and a third compartment located between said first and said second compartments and formed integral therewith for connecting said first compartment and said second compartment, said third compartment having a relatively smaller volume than said first and second compartments; and a sufficient quantity of a balancing fluid to counterbalance any of a plurality of imbalancing forces applied to said wheel during rotation thereof in an x, y or z plane, wherein said balancing fluid is sealed within said annular chamber and migrates, upon the application of imbalancing forces to the wheel during rotation thereof, to a position within the chamber opposite each said force, to continuously counterbalance the effect thereof.

8. A self-balancing wheel for motorized vehicles comprising:

a hub portion located substantially centrally upon said wheel;

a rim portion extending substantially circumferentially about said hub portion and integral therewith, said rim portion comprising inner and outer flange members adapted for securing a tire to said wheel;

an open annular chamber defined integrally within said rim portion of said wheel and extending uninterruptedly to said inner and outer flange members and around said rim portion, said annular chamber comprising first and second compartments extending, respectively, into said inner and said outer flange members, said first and said second compartments having substantially equal volumes, and a third compartment located between said first and said second compartments and formed integral therewith for connecting said first compartment and said second compartment, said third compartment having a reduced height relative to that of said first and said second compartments to produce a drop center within said rim portion for facilitating mounting and demounting a tire from said rim, said third compartment thus having a relatively smaller volume than said first and said second compartments; and a sufficient quantity of a balancing fluid to counterbalance any of a plurality of imbalancing forces applied to said wheel during rotation thereof in an x, y or z plane, wherein said balancing fluid is sealed within said annular chamber and migrates, upon the application of imbalancing forces to the wheel during rotation thereof, to a position within the chamber opposite each said force, to continually counterbalance the effect thereof.

* * * * *